(12) United States Patent
Shioya et al.

(10) Patent No.: US 8,007,682 B2
(45) Date of Patent: Aug. 30, 2011

(54) COMPOUND, LIQUID CRYSTAL COMPOSITION, OPTICAL ANISOTROPIC MATERIAL AND OPTICAL DEVICE

(75) Inventors: Kenichi Shioya, Koriyama (JP); Makoto Hasegawa, Koriyama (JP); Hiroshi Kumai, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 281 days.

(21) Appl. No.: 12/269,311

(22) Filed: Nov. 12, 2008

(65) Prior Publication Data
US 2009/0128769 A1    May 21, 2009

(30) Foreign Application Priority Data
Nov. 15, 2007 (JP) ................. 2007-297152

(51) Int. Cl.
*C09K 19/00* (2006.01)
*C09K 19/06* (2006.01)
*C09K 19/32* (2006.01)
*C09K 19/52* (2006.01)

(52) U.S. Cl. ........... 252/299.01; 252/299.6; 252/299.63; 349/183; 349/187; 428/1.1; 430/20

(58) Field of Classification Search ............. 252/299.01, 252/299.6, 299.63; 428/1.1; 430/20; 349/183, 349/187
See application file for complete search history.

(56) References Cited

U.S. PATENT DOCUMENTS

| | | | | |
|---|---|---|---|---|
| 6,979,413 B2 * | 12/2005 | Kaida et al. | ............... | 252/299.61 |
| 7,371,438 B2 * | 5/2008 | Kaida et al. | ................ | 428/1.1 |
| 7,442,418 B2 * | 10/2008 | Kaida et al. | ................ | 428/1.1 |
| 7,618,690 B2 * | 11/2009 | Nagayama et al. | ............. | 428/1.1 |
| 7,714,977 B2 * | 5/2010 | Hotaka et al. | ................ | 349/182 |
| 7,820,250 B2 * | 10/2010 | Yoshida et al. | ................ | 428/1.1 |
| 7,846,515 B2 * | 12/2010 | Yoshida et al. | ................ | 428/1.1 |

FOREIGN PATENT DOCUMENTS
JP     2004-263037     9/2004

\* cited by examiner

*Primary Examiner* — Geraldina Visconti
(74) *Attorney, Agent, or Firm* — Oblon, Spivak, McClelland, Maier & Neustadt, L.L.P.

(57) ABSTRACT

A compound of the following formula (1):

$$CH_2=CR^1-COO-R^2-OCO-Cy-COO-Cy-A-Cy-R^3 \quad (1)$$

wherein $R^1$ is a hydrogen atom or a methyl group; $R^2$ is a hydrocarbon group having from 1 to 8 carbon atoms, provided that some or all of hydrogen atoms bonded to carbon atoms in the group may be substituted by fluorine atoms, and when it has 2 or more carbon atoms, it may have an etheric oxygen atom in a carbon-carbon bond, $R^3$ is an alkyl or alkoxy group having from 1 to 8 carbon atoms, or a fluorine atom, provided that when it is the alkyl or alkoxy group, some or all of hydrogen atoms bonded to carbon atoms in the group may be substituted by fluorine atoms; Cy is a trans-1,4-cyclohexylene group, provided that hydrogen atoms bonded to carbon atoms in the group may independently be substituted by fluorine atoms, chlorine atoms or methyl groups; and A is a single bond, a trans-1,4-cyclohexylene group or a 1,4-phenylene group, provided that hydrogen atoms bonded to carbon atoms in the group may independently be substituted by fluorine atoms, chlorine atoms or methyl groups.

12 Claims, 3 Drawing Sheets

COMPOUND, LIQUID CRYSTAL COMPOSITION, OPTICAL ANISOTROPIC MATERIAL AND OPTICAL DEVICE

BACKGROUND OF THE INVENTION

1. Field of the Invention

The present invention relates to a novel compound, a liquid crystal composition containing the compound, an optical anisotropic material obtained by polymerizing the liquid crystal composition, and an optical device.

2. Discussion of Background

An optical device to modulate (e.g. polarize, diffract or phase-adjust) laser light, is required for an optical head device to read out information recorded on an optical disk or to write information on an optical disk.

For example, as shown in FIG. 3, at the time of reading out information, linearly-polarized light emitted from a light source 1 reaches an information recording surface of an optical disk 6 via a beam splitter 2, a collimator lens 3, a retardation plate 4 and an objective lens 5. The polarization direction of the outward linearly-polarized light is changed to circularly-polarized light by the retardation plate 4 after linearly passing through the beam splitter 2. Such circularly-polarized light is reflected on the information recording surface of the optical disk 6 and becomes inversely rotating circularly-polarized light, which returns via the objective lens 5, the retardation plate 4 to the collimator lens, inversely to the outward path. In this homeward path, the light is changed by the optical retardation plate 4 to linearly-polarized light perpendicular to the polarization before incidence. This homeward light is changed in the direction of the linearly-polarized light by 90° from the outward light, whereby when it passes through the beam splitter 2, its traveling direction is bent and then reaches the optical detector 7.

If plane fluctuations, etc. of the optical disk occur at the time of reading out or writing information, the focus point of the beam spot is likely to be displaced from the recording surface. In order to detect and correct such displacement and to let the beam spot follow a concavoconvex pit on the recording surface, a servomechanism not shown will be required. Such a servomechanism for an optical disk is designed to focus a beam spot irradiated from a laser light source on the recording surface and then to detect the position of the track thereby to follow the desired track. Further, it is also necessary to design so that laser light reflected without hitting the pit on the recording surface, will not return to the light source as it is.

The structure of the optical head device in FIG. 3 shows only the basic structure. There may be cases where other known structures are incorporated, such as a diffraction grating to generate three beams for tracking, an aperture-controlling device to meet light sources with plural wavelengths, a focus-controlling device to meet plural layers of information recording surfaces, and an aberration-correcting device.

Accordingly, in an optical head device, an optical device is required to modulate (e.g. polarize, diffract or phase-adjust) laser light from a light source. For example, a retardation plate (wavelength plate) has a function to present different refractive indices to incident light depending upon the angle between the optical axis of the retardation plate and the phase plane of the incident light and further has an effect to present a phase difference between two component lights formed by birefringence. The two lights having a phase lag will be combined when they come out from the retardation plate. This phase lag is determined by the thickness of the retardation plate, and accordingly, it is possible to prepare e.g. a ¼ wavelength plate to present a phase lag of $\pi/2$ or a ½ wavelength plate to present a phase lag of $\pi$, simply by adjusting the thickness. For example, linearly-polarized light passed through the ¼ wavelength plate will be circularly-polarized light, and a linearly-polarized light passed through the ½ wavelength plate will be linearly-polarized light with a polarization phase shifted by 90°. By utilizing such characteristics, optical devices are suitably combined and applied to a servomechanism, etc. Such an optical device is used not only in an optical head device used to read out a record on an optical disk but also in an imaging device to be used for e.g. a projector or in a communication device to be used for e.g. a wavelength-variable filter.

Further, such an optical device may be prepared also from a liquid crystal material. A liquid crystal molecule having a polymerizable functional group has both a characteristic as a polymerizable monomer and a characteristic as liquid crystal. Accordingly, by carrying out polymerization after aligning liquid crystal molecules having polymerizable functional groups, it is possible to obtain an optical anisotropic material having alignment of liquid crystal molecules fixed. Such an optical anisotropic material has an optical anisotropy such as a refractive index anisotropy derived from a mesogen skeleton, and it is applied to a diffraction device, phase-plate or the like by utilizing such characteristics.

As such an optical anisotropic material, high molecular weight liquid crystal has been reported which is obtained by polymerizing a liquid crystal composition containing a compound of the following formula (3) (provided that Z in the formula is an alkyl group) (Patent Document 1).

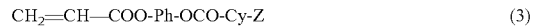

$$CH_2=CH-COO-Ph-OCO-Cy-Z \qquad (3)$$

The optical device is usually required to have the following characteristics.

1) It has a proper retardation value (Rd value) depending upon the wavelength used or application.
2) The in-plane optical characteristics (Rd value, transmittance, etc.) are uniform.
3) Scattering or absorption is not substantially observed at the wavelength to be used.
4) The optical characteristics can easily be adjusted with other materials constituting the device.
5) The wavelength dispersion of the refractive index or refractive index anisotropy is small at the wavelength to be used.

It is especially important to have a proper Rd value as mentioned in 1). The Rd value is defined by $Rd=\Delta n$ (value of refractive index anisotropy)$\times d$ (d is the thickness in light transmission direction), and accordingly, it becomes particularly important that the material constituting the optical device has a proper $\Delta n$ value. For example, in a case where $\Delta n$ is small, it is necessary to increase the thickness d. However, if the thickness d is increased, alignment of liquid crystal tends to be difficult, and it becomes difficult to obtain desired optical characteristics. On the other hand, in a case where the $\Delta n$ value is large, it becomes necessary to reduce the thickness d. However, in such a case, it becomes difficult to precisely control the thickness.

Further, in recent years, in order to enlarge the capacity of an optical disk, it has been attempted to shorten the wavelength of laser light to be used for writing and reading out information and to minimize the concavoconvex pit size on an optical disk. At present, a laser light with a wavelength of 780 nm is used for CD, a laser light with a wavelength of 650 nm is used for DVD, and a laser light with a wavelength of 405 nm is used for BD or HDDVD. It is possible to further shorten the wavelength for next generation optical recording media, and use of laser light with a wavelength of from 300 to 450 nm (hereinafter referred to also as blue laser light) is expected to further increase in the future. However, the conventional material such as high molecular weight liquid crystal disclosed in Patent Document 1 had a problem that the durability against blue laser light was inadequate.

For example, when an optical device (such as a retardation plate) made of an organic substance such as liquid crystal is disposed in an optical system and used as an optical head device, an aberration may sometimes occur as the time passes. This trouble is considered to be attributable to a fact that the organic substance is damaged by exposure to blue laser light. Once such an aberration occurs, it is likely that when light (luminous flux) emitted from a light source, passed through a collimator lens or an optical device or the like and further passed through an objective lens, reaches a recording medium surface, the luminous flux will not focus at one point, and the efficiency to write or read out information (the utilization efficiency of light) tends to deteriorate.

Further, in order to reduce the size and improve the efficiency of the device, a material having high refractive index anisotropy is required. Generally, a material having high refractive index anisotropy tends to have a high refractive index. Further, a high refractive index material has a characteristic such that the wavelength distribution of the refractive index is large, and it tends to have a high light absorption for light with a short wavelength (i.e. the molar absorption coefficient of the material tends to be large).

Therefore, a conventional high refractive index material has had a problem that it tends to absorb light with a short wavelength such as blue laser light, and its light stability is low. To solve such a problem, a material having a small molar absorption coefficient is desirable, and a compound having a totally alicyclic structure as a cyclic structure containing no aromatic ring may, for example, be mentioned. However, such a totally alicyclic liquid crystal monomer usually has a small birefringence anisotropy ($\Delta n$), and when it is made into a polymer, $\Delta n$ will be further smaller or isotropic, whereby there has been a problem that a desired liquid crystal property can hardly be obtainable. Specifically, the following compound (4-1) or (4-2) may, for example, be mentioned, but although the monomer exhibits optical anisotropy (birefringence), it becomes an isotropic polymer when polymerized.

$$CH_2=CH-COO-Cy-Cy-C_3H_7 \quad (4\text{-}1)$$

$$CH_2=CH-COO-Cy-Cy-C_5H_{11} \quad (4\text{-}2)$$

For an optical device such as an diffraction device or a retardation plate to modulate laser light with a wavelength of from 300 to 450 nm, an optically anisotropic material is desired which is excellent in durability with little deterioration even when exposed to laser light within this wavelength region and which is excellent in liquid crystallinity, and the structure of a liquid crystal monomer becomes very important.

Patent Document 1: JP-A-2004-263037

SUMMARY OF THE INVENTION

The present invention has been made to solve the above-mentioned problems, and it is an object of the present invention to provide an optical anisotropic material and optical device which satisfy the characteristics required for the optical anisotropic material and optical device and provide a proper Rd value depending upon the application and the wavelength to be used and which have high durability particularly against blue laser light, and a novel liquid crystal composition and compound to be used for their preparation.

In order to solve the above-mentioned problems, the present invention provides a novel compound. Specifically, it provides the following.

(1) A compound of the following formula (1):

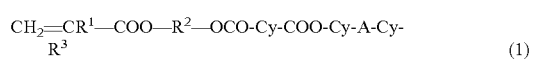

$$CH_2=CR^1-COO-R^2-OCO-Cy-COO-Cy-A-Cy-R^3 \quad (1)$$

wherein $R^1$ is a hydrogen atom or a methyl group; $R^2$ is a hydrocarbon group having from 1 to 8 carbon atoms, provided that some or all of hydrogen atoms bonded to carbon atoms in the group may be substituted by fluorine atoms, and when it has 2 or more carbon atoms, it may have an etheric oxygen atom in a carbon-carbon bond, $R^3$ is an alkyl or alkoxy group having from 1 to 8 carbon atoms, or a fluorine atom, provided that when it is the alkyl or alkoxy group, some or all of hydrogen atoms bonded to carbon atoms in the group may be substituted by fluorine atoms; Cy is a trans-1,4-cyclohexylene group, provided that hydrogen atoms bonded to carbon atoms in the group may independently be substituted by fluorine atoms, chlorine atoms or methyl groups; and A is a single bond, a trans-1,4-cyclohexylene group or a 1,4-phenylene group, provided that hydrogen atoms bonded to carbon atoms in the group may independently be substituted by fluorine atoms, chlorine atoms or methyl groups.

(2) The compound according to the above (1), wherein A is a single bond.

(3) The compound according to the above (2), wherein $R^2$ is an alkylene group wherein some or all of hydrogen atoms bonded to carbon atoms may be substituted by fluorine atoms, and $R^3$ is an alkyl group wherein some or all of hydrogen atoms bonded to carbon atoms may be substituted by fluorine atoms.

(4) A liquid crystal composition comprising at least two compounds selected from the group consisting of compounds of the formula (1) as defined in any one of the above (1) to (3), or at least one compound of the formula (1) and at least one polymerizable liquid crystal compound other than the compound of the formula (1).

(5) An optical anisotropic material comprising a polymer obtained by polymerizing the liquid crystal composition as defined in the above (4) in a state exhibiting a liquid crystal phase and in a state where liquid crystal is aligned.

(6) An optical device employing the optical anisotropic material as defined in the above (5).

According to the present invention, it is possible to obtain a novel compound, a liquid crystal composition containing the compound, an optically anisotropic material obtained by polymerizing the liquid crystal composition and an optical device employing the optically anisotropic material. By using the novel compound and liquid crystal composition of the present invention, it is possible to obtain a proper Rd value depending upon the application and the wavelength to be used. The optically anisotropic material and optical device of the present invention is useful for a pickup device, an imaging device, a communication device, etc., and excellent in durability against blue laser light.

MEANINGS OF SYMBOLS

Figure 1:
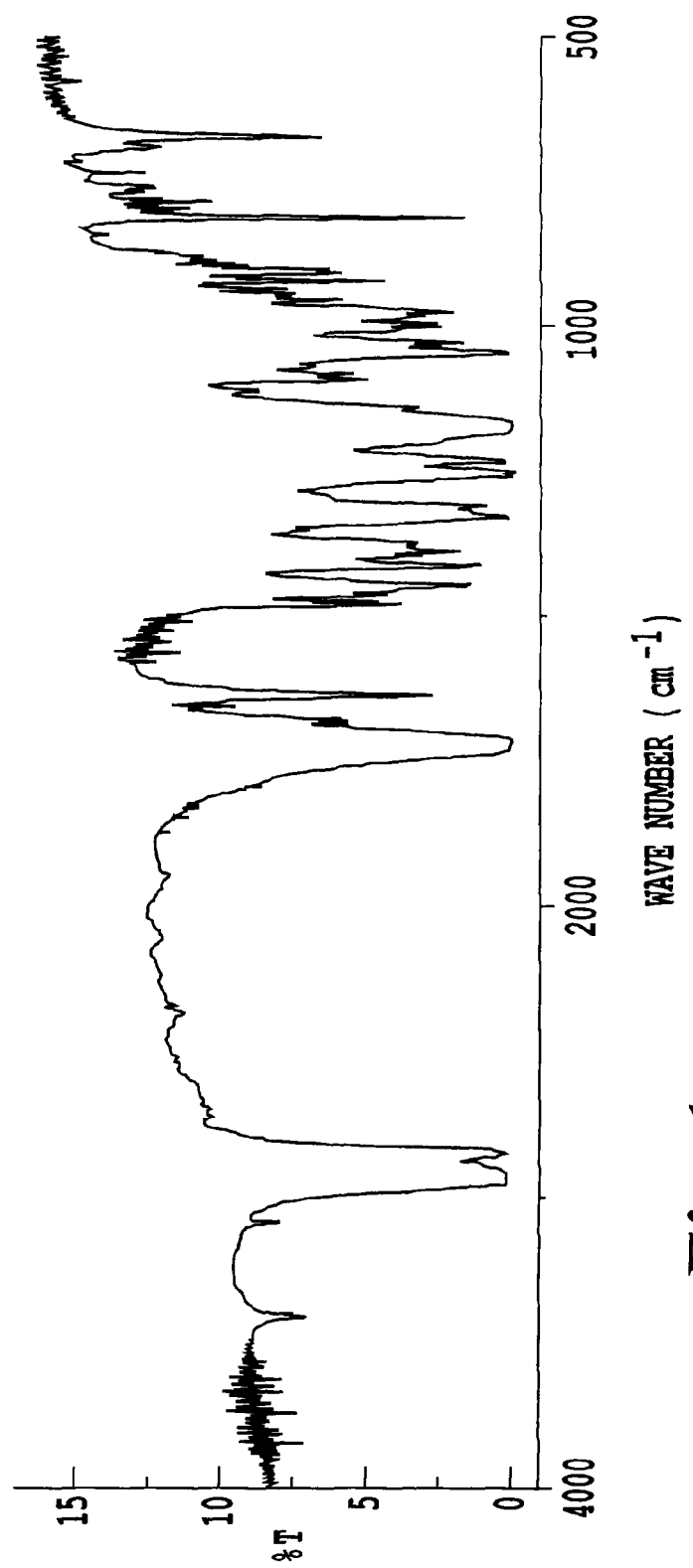
FIG. 1 is a graph showing the IR spectrum of the compound (1A) of the present invention.

1: Light source
2: Beam splitter
3: Collimator lens
4: Phase plate
5: Objective lens
6: Optical disk
7: Photodetector

BEST MODE FOR CARRYING OUT THE INVENTION

In this specification, a compound of the formula (1) will be referred to also as a compound (1). Other compounds may also be referred to in the same manner. The trans-1,4-cyclohexylene group in this specification may be a non-substituted group, or a hydrogen atom bonded to a carbon atom in the group may be substituted by a fluorine atom, a chlorine atom or a methyl group. It is preferred that the trans-1,4-cyclohexylene group is a non-substituted group.

Further, a compound having both liquid crystallinity and polymerizability will hereinafter be referred to as a polymerizable liquid crystal. In the following, a wavelength means that it is within a range of the center wavelength ±2 nm. Further, a refractive index anisotropy is represented by Δn.

The compound of the present invention is a compound of the following formula (1). This compound (1) is one type of polymerizable liquid crystal having both polymerizability and liquid crystallinity.

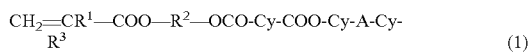
(1)

Here, $R^1$ is a hydrogen atom or a methyl group, preferably a hydrogen atom. If $R^1$ is a hydrogen atom, as described hereinafter, when a liquid crystal composition containing the compound (1) is subjected to photopolymerization to obtain an optically anisotropic material and optical device, the polymerization proceeds smoothly, such being desirable. Further, there is an additional merit such that the characteristics of the optically anisotropic material and optical device obtainable by photopolymerization tend to be less susceptible to influence of the external environment (such as the temperature), and in-plane distribution of retardation is small.

$R^2$ is a hydrocarbon group having from 1 to 8 carbon atoms, provided that some or all of hydrogen atoms bonded to carbon atoms in the group may be substituted by fluorine atoms, and when it has 2 or more carbon atoms, it may have an etheric oxygen atom in a carbon-carbon bond. It is particularly preferably an alkylene group which is capable of suppressing a smectic property which will be a cause for a decrease in transmittance by scattering. Further, when a polymerizable liquid crystal is polymerized, the value of Δn tends to decrease between before and after the polymerization, but when $R^2$ has a polymethylene group, it is possible to suppress the decrease in the value Δn between before and after the polymerization. Further, if the number of carbon atoms is small, the melting point tends to be high, and the compatibility with other materials tends to be poor, and if the number of carbon atoms is large, the above-mentioned smectic property is likely to develop. Therefore, $R^2$ is particularly preferably an alkylene group having from 2 to 8 carbon atoms, especially preferably a polymethylene group.

$R^3$ is an alkyl or alkoxy group having from 1 to 8 carbon atoms, or a fluorine atom, provided that when it is the alkyl or alkoxy group, some or all of hydrogen atoms bonded to carbon atoms in the group may be substituted by fluorine atoms. It is particularly preferably an alkyl group, whereby the melting point (Tm) of a liquid crystal composition containing the compound (1) (namely, the phase transition point of crystal phase-nematic phase) can be made low. Particularly, an alkyl group having from 2 to 6 carbon atoms is more preferred. Further, in the case of an alkyl group, it preferably has a straight chain structure, since it is thereby possible to broaden the temperature range wherein the compound (1) is shows liquid crystallinity.

Cy is a trans-1,4-cyclohexylene group, provided that hydrogen atoms bonded to carbon atoms in the group may independently be substituted by fluorine atoms, chlorine atoms or methyl groups. It is particularly preferred that the trans-1,4-cyclohexylene group is a non-substituted group.

A is a single bond, a trans-1,4-cyclohexylene group or a 1,4-phenylene group, provided that hydrogen atoms bonded to carbon atoms in the group may independently be substituted by fluorine atoms, chlorine atoms or methyl groups. Particularly preferred is a compound of the following formula (2) wherein A is a single bond, whereby the liquid crystal temperature range is wide, and the light stability will be excellent as the ring structure contains only a trans-1,4-cyclohexylene group.

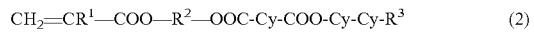
(2)

Further, in a case where A is a trans-1,4-cyclohexylene group or a 1,4-phenylene group, such a group is preferably a non-substituted group.

As mentioned above, among compounds of the formula (2), a compound is preferred wherein $R^2$ is an alkylene group wherein some or all of hydrogen atoms bonded to carbon atoms in the group may be substituted by fluorine atoms, and $R^3$ is an alkyl group wherein some or all of hydrogen atoms bonded to carbon atoms in the group may be substituted by fluorine atoms.

The preparation method of the compound (1) of the present invention will be described with reference to a specific example (wherein the symbols in the formulae are as defined above).

Preparation Method 1

The following method may, for example, be mentioned as a method for preparation of the compound of the present invention. Here, as the polymerization site, a case of an acryloyl group will be described, but also in a case of a methacryloyl group, the synthesis can be carried out in the same manner by changing the compound (12) to the corresponding methacryloyl compound.

Firstly, the following compound (11) is converted to an acid chloride with thionyl chloride, and then reacted with the following compound (12) in the presence of pyridine to obtain the following compound (13). Then, the compound (13) is reacted with the following compound (14) in the presence of EDC and DMAP to obtain the following compound (15).

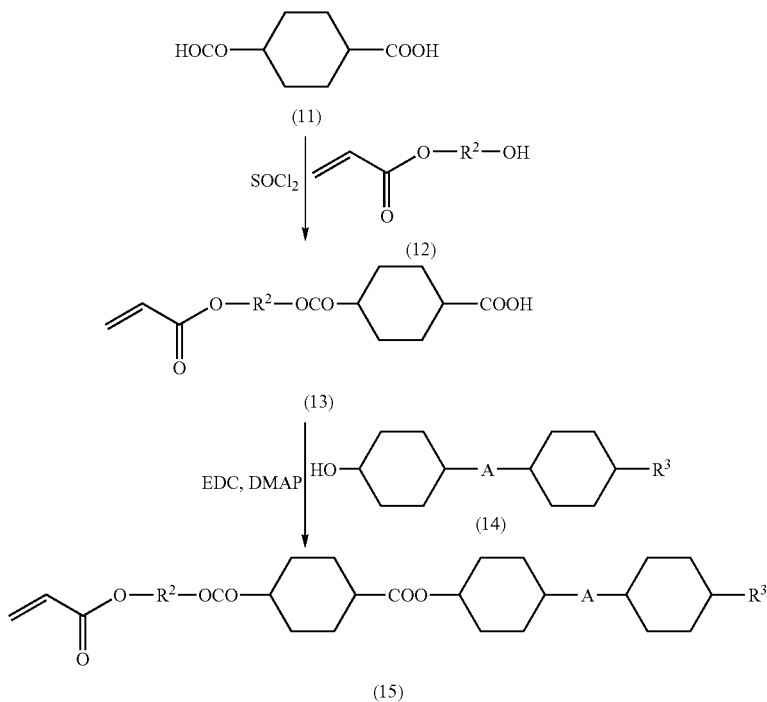

The compound (1) of the present invention has good durability to laser light when it has at least three trans-1,4-cyclohexylene groups as cyclic saturated hydrocarbon groups. Namely, when it has cyclic saturated hydrocarbon groups with little light absorption even in a short wavelength region of 400 nm or less, the absorption of blue laser light is little. Especially when A is a single bond or a trans-1,4-cyclohexylene group, all rings are cyclic saturated hydrocarbon groups, whereby light stability to blue laser light is high.

Further, in general, if a polymerizable liquid crystal is polymerized, the value of Δn tends to decrease between before and after the polymerization. However, in a case where a structure having a hydrocarbon group, particularly an alkylene group having at least two carbon atoms, especially a polymethylene group, is bonded to an acryloyl group or a methacryloyl group, it is possible to suppress the decrease in the value Δn. Accordingly, with an optical device obtainable by using the compound (1), it is possible to obtain good utilization efficiency of light when it is utilized for an optical head device.

Further, when an optical device made of an organic substance such as liquid crystal is disposed in an optical system and used as an optical head device, an aberration may sometimes occur as the time passes. In the case of employing an optical device made of an organic substance, it is difficult to completely eliminate a damage by laser light, but it is desired to suppress such a damage as far as possible. By using an optical device prepared by utilizing the liquid crystal compound of the present invention, it is possible to suppress occurrence of the aberration between before and after the accelerated exposure test with blue laser light. Namely, it is possible to suppress occurrence of the aberration even when irradiated with laser light (particularly blue laser light) for a long period of time, whereby it is possible to maintain the light utilization efficiency over a long period of time. Accordingly, by using the compound (1), it is possible to provide an optically anisotropic material and optical device which have sufficient durability to blue laser light and which are excellent in the characteristics such as the phase difference.

The compound (1) of the present invention is preferably used as one component of a polymerizable liquid crystal composition to obtain polymer liquid crystal. In such a case, this liquid crystal composition is preferably a liquid crystal composition comprising at least two compounds selected from compounds (1), or a liquid crystal composition comprising at least one compound (1) and at least one polymerizable liquid crystal compound other than the compound (1), so that the is liquid crystal composition to obtain polymer liquid crystal shows liquid crystallinity even at a low temperature side. With such a liquid crystal composition, the temperature range wherein the composition exhibits a liquid crystal phase, can be made broadened. Further, the melting point (Tm) may be lowered, and its handling will be easy. Hereinafter, the polymerizable liquid crystal other than the compound (1) will be referred to as the compound (5).

In a case where the liquid crystal composition comprises the compound (1) and the compound (5), the compound (5) is preferably a compound having an acryloyl group or a methacryloyl group, particularly preferably a compound having an acryloyl group. Further, the polymerizable liquid crystal being such a compound (5) preferably has high durability against blue laser light and thus preferably contains no Ph-CO— structure in its mesogen structure.

As such a compound (5), a compound of the following formula (6) (which will be referred to also as the compound (6)) is preferred.

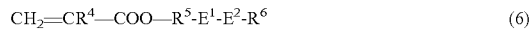

The symbols in the formula have the following meanings.
$R^4$: A hydrogen atom or a methyl group.
$R^5$: A single bond or a hydrocarbon group having from 1 to 8 carbon atoms or a hydrocarbon group having from 1 to 8 carbon atoms, wherein an etheric oxygen atom is bonded on the $E^1$ side. However, some or all of hydrogen atoms bonded to carbon atoms in the group may be substituted by fluorine atoms, and when the hydrocarbon group has 2 or more carbon atoms, it may have an etheric oxygen atom in a carbon-carbon bond.

$R^6$: An alkyl or alkoxy group having from 1 to 8 carbon atoms, or a fluorine atom. However, when it is an alkyl or alkoxy group, some or all of hydrogen atoms bonded to carbon atoms in the group may be substituted by fluorine atoms.

$E^1$, $E^2$: Each independently a 1,4-phenylene group or a trans-1,4-cyclohexylene group. However, hydrogen atoms bonded to carbon atoms in the group may independently be substituted by fluorine atoms, chlorine atoms or methyl groups. Further, at least one of $E^1$ and $E^2$ is a trans-1,4-cyclohexylene group.

Among compounds (6), the following compound (7) is preferred wherein $R^5$ is a single bond, and each of $E^1$ and $E^2$ is a trans-1,4-cyclohexylene group.

$$CH_2=CR^4-COO-Cy-Cy-R^6 \qquad (7)$$

The liquid crystal composition of the present invention to produce polymer liquid crystal may contain components other than the polymerizable liquid crystal compound, as fundamental components (hereinafter referred to as other components). Such other components may, for example, include an adjusting component being a polymerizable non-liquid crystal compound or non-polymerizable liquid crystal compound to adjust the compatibility, refractive index, liquid crystal temperature range, etc. as a liquid crystal composition, and additive components such as a polymerization initiator, a polymerization inhibitor, a chiral agent, an ultraviolet absorber, an antioxidant, a photostabilizer, a colorant and a dichromatic colorant.

The liquid crystal composition of the present invention is a liquid crystal composition containing the polymerizable liquid crystal compound in an amount of at least 75 mass % as a fundamental component, preferably a liquid crystal composition containing the polymerizable liquid crystal compound in an amount of at least 90 mass %, particularly preferably at least 95 mass %. The remaining portion of such a liquid crystal composition is constituted by a polymerizable non-liquid crystal compound or non-polymerizable liquid crystal compound as an adjusting component and additive components. Here, the additive components are usually preferably in a total amount of at most 5 mass %.

In the present invention, the polymerizable liquid crystal composition to produce polymer liquid crystal contains at least 5 mass % of the compound (1), based on all polymerizable liquid crystal compounds in the liquid crystal composition. Particularly, a liquid crystal composition containing at least 30 mass % of the compound (1) is preferred. In a case where other materials are to be mixed in order to adjust the characteristics as a liquid crystal composition, the material of the compound (1) may be at most 95 mass %.

Now, the optical anisotropic material of the present invention will be described. The optical anisotropic material of the present invention comprises a polymer obtained by polymerizing the above-described liquid crystal composition in a state where the liquid crystal composition exhibits a liquid crystal phase and in a state where liquid crystal is aligned.

In order to maintain the state where the liquid crystal composition exhibits a liquid crystal phase, the atmosphere temperature may be adjusted to be at most the clearing point Tc (the phase transition temperature of nematic phase-isotropic phase). However, at a temperature close to Tc, Δn of the liquid crystal composition is very small, and therefore, the upper limit of the atmosphere temperature is preferably adjusted to be at most (Tc−10)° C.

The polymerization may be photopolymerization or thermal polymerization, preferably photopolymerization. Light to be used for the photopolymerization is preferably ultraviolet ray or visible light ray. In a case where the photopolymerization is to be carried out, it is preferred to employ a photopolymerization initiator, and the photopolymerization initiator is preferably one suitably selected from acetophenones, benzophenones, benzoins, benzyls, Michler ketones, benzoine alkyl ethers, benzyl dimethyl ketals and thioxanthones. Such photopolymerization initiators may be used alone or in combination as a mixture of two or more of them. The amount of the photopolymerization initiator is preferably from 0.1 to 5 mass %, particularly preferably from 0.3 to 2 mass %, based on the total amount of the liquid crystal composition.

Now, the optical device of the present invention will be described. The optical device of the present invention is obtained by interposing the above liquid crystal composition between a pair of support members subjected to alignment treatment and polymerizing it in a state where the liquid crystal composition exhibits a liquid crystal phase and in a state where the liquid crystal is aligned. Such support members may be peeled, as the case requires, and the exposed surface may then be subjected to concavo-convex shape forming processing, surface treatment or the like.

For example, at least one of the support members is removed to obtain an optically anisotropic film, and further, a reinforcing film may be bonded as the case requires, or a plurality of such optically anisotropic films may be laminated and bonded for use as a retardation plate. Otherwise, in a state where the optically anisotropic material is disposed on a support member or on another support member provided instead of the support member, linear periodical concavoconvexes are formed by a photolithographic step, an etching step, etc. to obtain a diffraction device, or a Fresnel lens structure is circularly formed to obtain a lens device or an aberration-correcting device. Further, various applications are available, such that a reflection layer is formed, and an aperture may be used in combination.

Further, the above-mentioned concavoconvexes of an optically anisotropic material may be combined with a liquid crystal composition, and such a combination is interposed between support members provided with electrodes to form an optical device, which may be used as an optical device capable of changing the diffraction function, lens function or aberration-correcting function by applying a voltage.

As the support members, substrates having alignment treatment applied on their surfaces are used, and in a case where photopolymerization is to be carried out, at least one of them is a transparent substrate. Usually, a transparent glass or plastic substrate is preferred. The alignment treatment may be carried out by a method of directly rubbing the surface of a transparent substrate with fibers of e.g. cotton, wool, nylon, polyester or the like, a method of laminating a polyimide alignment film on the surface of a transparent substrate and then rubbing the surface of such an alignment film with the above-mentioned fibers, or a method of obliquely vapor-depositing an inorganic material on the surface of a transparent substrate.

Then, on the surface having such alignment treatment applied, a spacer such as glass beads, is placed, and a plurality of supporting members are adjusted to face one another with a desired space, and after interposing the liquid crystal composition between the support members, polymerization is carried out. The polymer obtained by the polymerization may be used as interposed between the support members or may be used as peeled from the support members. The optical device of the present invention is a device containing an optically anisotropic material being such a polymer, and it is preferred that the polymer is used as interposed between the support members.

The optically anisotropic material and optical device of the present invention exhibits good durability against blue laser light, and thus are useful as an optically anisotropic material and optical device to be used by transmitting blue laser light. It is particularly useful as an optically anisotropic material or an optical device employing an optically anisotropic material, to be used for modulating the phase state and/or the wave front state of blue laser light.

For example, it is used as mounted on an optical head device, as a diffraction device such as a polarization hologram, a retardation plate or the like. As the polarization hologram, an example may be mentioned wherein light emitted from a light source is reflected by an information recording surface of an optical disk to generate a signal light, which is separated and introduced into a photodetector. As the retardation plate, an example wherein it is used as a ½ wavelength plate to control the phase difference of light emitted from a laser light source, or an example wherein it is installed as a ¼ wavelength plate in a light path to stabilize the output of a laser light source. As other applications, a retardation plate for a projector, a light polarizer, etc. may be mentioned.

Now, the present invention will be described in detail with reference to Examples for preparation of the compounds of the present invention. However, it should be understood that the preparation of compounds of the present invention is by no means restricted by such Examples.

PREPARATION EXAMPLE 1

Preparation of Compound (1A)

EXAMPLE 1-1

Preparation of Compound (13A)

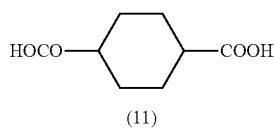

(11)

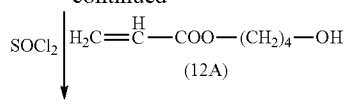

(12A)

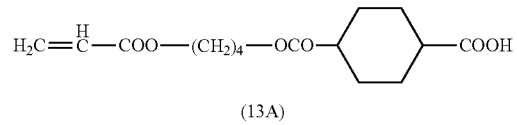

(13A)

Into a 1,000 mL four-necked flask equipped with a reflux device, a stirrer and a dropping device, the compound (11) (82 g, 0.476 mol), SOCl₂ (113.31 g, 0.952 mol), one or two droplets of DMF and 500 mL of toluene were added and refluxed at 100° C. for 4 hours in a nitrogen stream. The precipitated acid chloride was obtained as white solid by distilling the solvent off. The obtained acid chloride was transferred to 2,000 mL four-necked flask and dissolved in 1,000 mL of dichloromethane. To this solution, a mixed solution comprising the compound (12A) (55.3 g, 0.476 mol) and pyridine (37.67 g, 0.476 mol) was dropwise added over a period of 3 hours. After completion of the dropwise addition, stirring was carried out overnight at room temperature. After completion of the reaction, 500 mL of pure water was added to terminate the reaction, followed by liquid separation by using a separating funnel to recover an organic layer.

The recovered organic layer was washed with pure water (500 mL) and then with a saturated sodium chloride aqueous solution, and the organic layer was again recovered. The organic layer was dried over anhydrous magnesium sulfate, then the anhydrous magnesium sulfate was removed by filtration under reduced pressure, and the filtrate was concentrated. This filtrate was purified by column chromatography employing ethyl acetate/hexane (5:5 by volume ratio) as a developer, and then, the fraction containing the desired product was concentrated to obtain the compound (13A) (65 g) as a brown oily substance. The yield was 43%.

EXAMPLE 1-2

Preparation of Compound (1A)

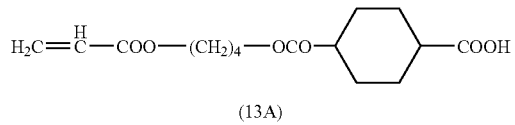

(13A)

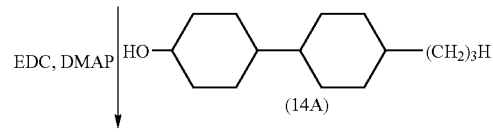

(14A)

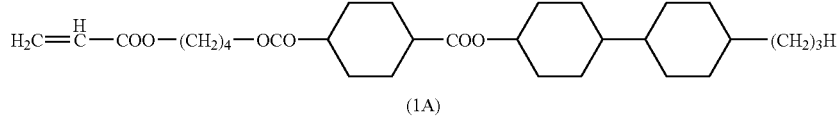

(1A)

Into a 500 mL four-necked flask equipped with a stirrer, the compound (14A) (5 g, 0.022 mol), the compound (13A) obtained in Example 1-1 (6.65 g, 0.022 mol), N,N-dimethyl-4-aminopyridine (1.2 g, 0.010 mol), EDC (1-ethyl-3-(3-dimethylaminopropyl)carbodiimide hydrochloride) (6.84 g, 0.036 mol) and dichloromethane (200 mL) were added and stirred at room temperature overnight in a nitrogen stream. After the stirring, 200 mL of an aqueous ammonium chloride solution was added to terminate the reaction.

Then, 100 mL of dichloromethane was added, followed by liquid separation, and the aqueous phase was extracted twice with 200 mL of dichloromethane. The recovered organic phases were put together and washed twice with 200 mL of 5% hydrochloric acid and then with 200 mL of a saturated sodium chloride aqueous solution, and the organic layer was recovered again. The organic layer was dried over anhydrous magnesium sulfate. After removing the anhydrous magnesium sulfate, the dried solution was subjected to solvent distillation. To the obtained crystals, 300 mL of hexane was added, followed by stirring at 50° C., and the insoluble component was filtered off. The filtrate was subjected to solvent distillation to obtain 11.44 g of white crystals. The obtained crystals were recrystallized from hexane for purification to obtain the compound (1A) (10.17 g). The yield was 90%. Further, by using the compound (14B) instead of the compound (14A), the compound (1B) was prepared.

merizable liquid crystal compounds constituting the liquid crystal compositions. Further, as other polymerizable liquid crystal compounds, the following compounds (4-1) and (4-2) were used.

$$CH_2=CH-COO-Cy-Cy-C_3H_7 \quad (4\text{-}1)$$

$$CH_2=CH-COO-Cy-Cy-C_5H_{11} \quad (4\text{-}2)$$

Then, to the liquid crystal compositions A to C, the polymerization initiator (0.5 mass % based on the respective liquid crystal compositions) and a polymerization inhibitor (0.2 mass % based on the respective liquid crystal compositions) were added to obtain liquid crystal compositions A1 to C1.

Tables 1 and 2 show the melting point Tm (° C.) and the clearing point Tc (° C.) measured during the temperature rise of the liquid crystal compositions A to C, and the values of Δn of the monomer (60° C.) and the polymer (room temperature) to blue laser light with 406 nm of the liquid crystal compositions A1 to C1. With the liquid crystal composition C1, after the polymerization, no birefringence was obtained, and Δn was not measured.

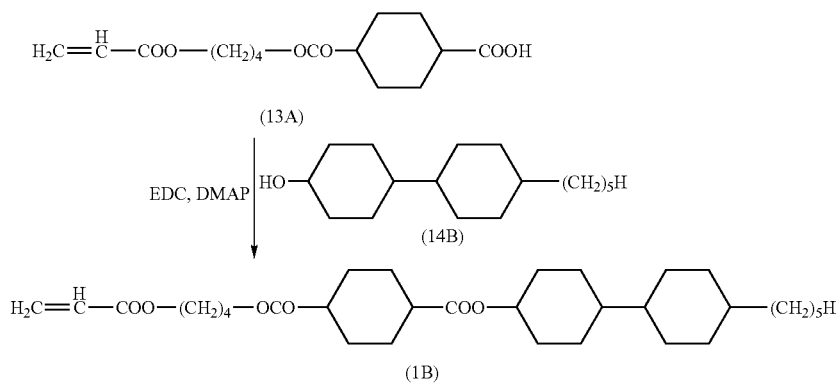

Figure 2:
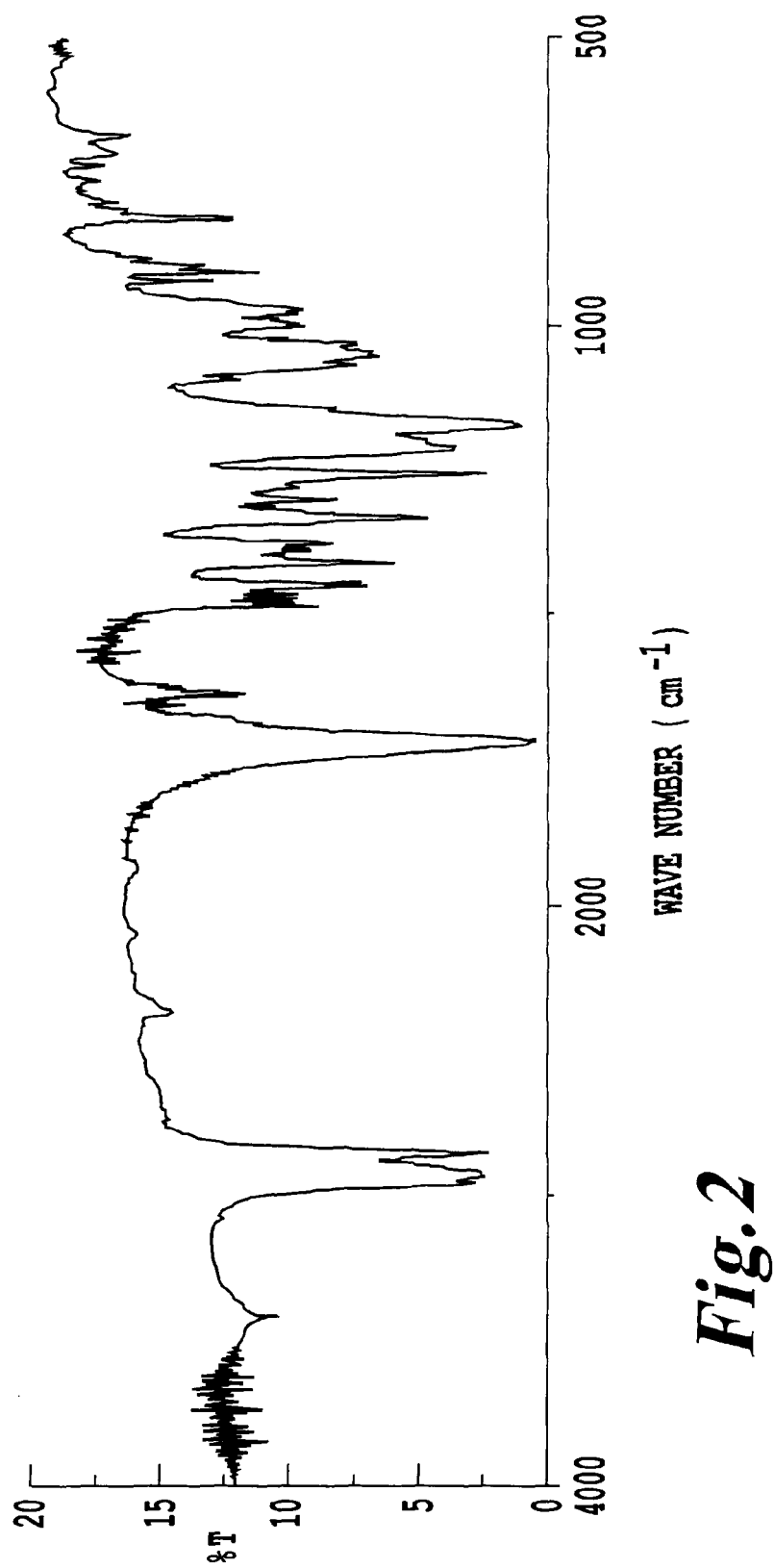
FIG. 2 is a graph showing the IR spectrum of the compound (1B) of the present invention.
Figure 3:
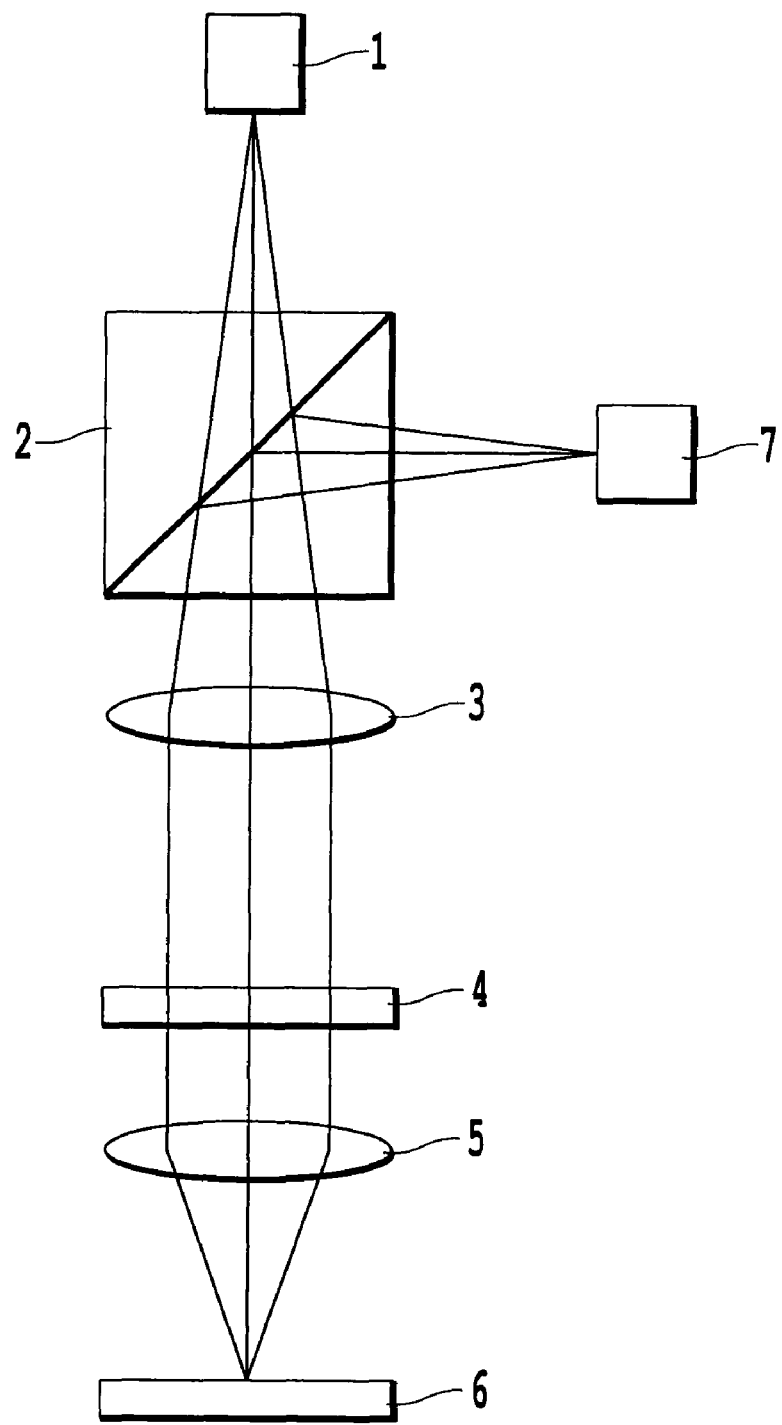
FIG. 3 is a schematic view illustrating the basic construction of an optical head device in which the optical device of the present invention may be used.

IR spectra of the compounds (1A) and (1B) are shown in FIGS. 1 and 2, respectively, and 1H NMR spectrum of the compound (1A) is shown below.

1H NMR (400 MHz, solvent: CDCl$_3$, internal standard: TMS) δ (ppm): 0.98 (t, 3H), 1.2-1.9 (m, 39H), 2.27 (m, 2H), 3.91 (m, 1H), 4.08 (t, 2H), 4.15 (t, 2H), 5.8-6.4 (m, 3H)

Now, examples of the liquid crystal composition of the present invention using the compound (1A) prepared in the above Preparation Example 1 will be specifically described. However, it should be understood that the present invention is by no means restricted by such Examples. In the following Examples, as a photopolymerization initiator, "IRGACURE 907" manufactured by Ciba Specialty Chemicals K.K., was used.

Preparation of Liquid Crystal Compositions A to C

Polymerizable liquid crystal compounds were mixed in the proportions as shown in Table 1 to obtain polymerizable liquid crystal compositions A to C. Here, the proportions disclosed in Table 1 are proportions (mol %) of the respective polymerizable liquid crystal compounds to the entire poly-

TABLE 1

| Example Nos. | Ex. 1 | Ex. 2 | Ex. 3 |
|---|---|---|---|
| Compositions | Composition A | Composition B | Composition C |
| Example or Comparative Example Composition (mol %) | Example | Example | Comparative Example |
| Compound (1A) | 12.5 | 10.0 | 0.0 |
| Compound (1B) | 12.5 | 10.0 | 0.0 |
| Compound (4-1) | 37.5 | 40.0 | 50.0 |
| Compound (4-2) | 37.5 | 40.0 | 50.0 |
| Melting point Tm (° C.) | Not higher than room temperature | Not higher than room temperature | 53 |
| Clearing point Tc (° C.) | 110 | 105 | 97 |

TABLE 2

| Example Nos. | Ex. 1 | Ex. 2 | Ex. 3 |
|---|---|---|---|
| Compositions | Composition A1 | Composition B1 | Composition C1 |
| Example or Comparative Example | Example | Example | Comparative Example |
| Δn (monomer) | 0.0655 | 0.0619 | 0.0676 |
| Δn (polymer) | 0.0057 | 0.0046 | 0 |

Preparation of Optical Device A

On a glass substrate of 5 cm×5 cm having a thickness of 0.5 mm, a polyimide solution was applied by a spin coater and dried, followed by rubbing treatment in a predetermined direction with a nylon cloth to prepare a support member.

Two such support members were bonded by means of an adhesive so that the sides subjected to alignment treatment would face each other, to form a cell. To the adhesive, glass beads having a diameter of 4 μm were added to adjust the space between the support members to be 4 μm.

Then, into the above cell, the liquid crystal composition A1 prepared in Example 1 was injected at 90° C. Ultraviolet rays having an intensity of 50 mW/cm$^2$ were applied at 30° C. so that the cumulative quantity of light would be 9,000 mJ/cm$^2$, to carry out photopolymerization thereby to obtain an optical device A. The optical device A was homogeneous alignment in the rubbing direction of the substrate. The optical device A was transparent in the visible range, and no scattering was observed. Further, Δn to laser light with a wavelength of 405 nm was 0.0057.

Evaluation of Optical Device A

The optical device A obtained in the above Example for preparation of optical device A, was irradiated with Kr laser (multimode with wavelengths of 407 nm and 413 nm) to carry out an accelerated test for exposure to blue laser light. The irradiation conditions were such that the temperature was 60° C., and the cumulative exposure energy was 20 W·hour/mm$^2$. The decrease in Δn after the accelerated test to Δn before the test, was less than 1%. Further, after the accelerated test, the aberration at the exposed portion was measured, whereby the difference between the maximum value and the minimum value of the aberration at that portion was less than 10 mλ (λ corresponds to a wavelength of 405 nm of the measured light). From the foregoing, the optical device A was confirmed to be excellent in the durability against blue laser light.

Preparation of Liquid Crystal Composition D

Two types of the following compounds (8-1) and (8-2) were mixed in a molar ratio of 1:1 to prepare a liquid crystal composition D. Then, to the liquid crystal composition D, a photopolymerization initiator was added in an amount of 0.2 mass % based on the liquid crystal composition D to obtain a liquid crystal composition D1.

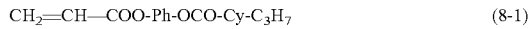

$CH_2=CH-COO-Ph-OCO-Cy-C_3H_7$ (8-1)

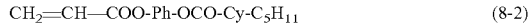

$CH_2=CH-COO-Ph-OCO-Cy-C_5H_{11}$ (8-2)

Preparation of Optical Device Composition D

In the same manner as in the case of the liquid crystal composition A1, the liquid crystal composition D1 was injected into the above-mentioned cell at 70° C. Ultraviolet rays having an intensity of 80 mW/cm$^2$ were applied at 30° C. so that the cumulative quantity of light would be 5,300 mJ/cm$^2$, to carry out photopolymerization thereby to obtain an optical device D. Δn to laser light with a wavelength of 568 nm was 0.0352. Further, the optical device D was transparent in the visible light range, and no scattering was observed.

Evaluation of Optical Device Composition D

The optical device D was subjected to an accelerated test for exposure to blue laser light in the same manner as in the case of the optical device A. However, the cumulative exposure energy was 15 W·hour/mm$^2$. After the accelerated test, the aberration at the exposed portion was measured, whereby the difference between the maximum value and the minimum value of the aberration at that portion was at least 300 mλ (λ corresponds to a wavelength of 405 nm of the measured light).

Preparation of Liquid Crystal Composition E

Four types of the above compounds (8-1), (8-2), (4-1) and (4-2) were mixed in a molar ratio of 1:1:1:1 to prepare a liquid crystal composition E. Then, to the liquid crystal composition E, a photopolymerization initiator was added in an amount of 0.2 mass % based on the liquid crystal composition E, to obtain a liquid crystal composition E1.

Preparation of Optical Device E

An optical device E was obtained in the same manner as in the above-mentioned preparation of the optical device A except that the liquid crystal composition A1 was changed to the liquid crystal composition E1. Δn to laser light with a wavelength of 405 nm was 0.0403. Further, the optical device E was transparent in the visible light range, and no scattering was observed.

Evaluation of Optical Device E

The optical device E was subjected to an accelerated test for exposure to blue laser light in the same manner as in the case of the optical device A. However, the cumulative exposure energy was 15 W·hour/mm$^2$. After the accelerated test, the aberration at the exposed portion was measured, whereby the difference between the maximum value and the minimum value of the aberration at that portion was at least 100 mλ (λ corresponds to a wavelength of 405 nm of the measured light).

INDUSTRIAL APPLICABILITY

The novel compound of the present invention and the optically anisotropic material obtained by polymerizing a liquid crystal composition containing such a compound, well satisfy the characteristics required for usual optically anisotropic materials and further are excellent in the light stability against blue laser light. Accordingly, an optical device prepared by utilizing such a novel compound of the present invention is useful not only for an optical device heretofore utilized as an optical head device, an imaging device or a communication device, but also as a material for a diffraction element or retardation plate to modulate blue laser light.

The entire disclosure of Japanese Patent Application No. 2008-297152 filed on Nov. 15, 2007 including specification, claims, drawings and summary is incorporated herein by reference in its entirety.

What is claimed is:

1. A compound of the following formula (1):

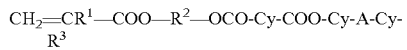

CH$_2$=CR$^1$—COO—R$^2$—OCO-Cy-COO-Cy-A-Cy-R$^3$ (1)

wherein R$^1$ is a hydrogen atom or a methyl group; R$^2$ is a hydrocarbon group having from 1 to 8 carbon atoms, provided that some or all of hydrogen atoms bonded to carbon atoms in the group may be substituted by fluorine atoms, and when it has 2 or more carbon atoms, it may have an etheric oxygen atom in a carbon-carbon bond; R$^3$ is an alkyl or alkoxy group having from 1 to 8 carbon atoms, or a fluorine atom, provided that when it is the alkyl or alkoxy group, some or all of hydrogen atoms bonded to carbon atoms in the group may be substituted by fluorine atoms; Cy is a trans-1,4-cyclohexylene group, provided that hydrogen atoms bonded to carbon atoms in the group may independently be substituted by fluorine atoms, chlorine atoms or methyl groups; and A is a single bond, a trans-1,4-cyclohexylene group or a 1,4-phenylene group, provided that hydrogen atoms bonded to carbon atoms in the group may independently be substituted by fluorine atoms, chlorine atoms or methyl groups.

2. The compound according to claim 1, wherein A is a single bond.

3. The compound according to claim 2, wherein R$^2$ is an alkylene group wherein some or all of hydrogen atoms bonded to carbon atoms may be substituted by fluorine atoms, and R$^3$ is an alkyl group wherein some or all of hydrogen atoms bonded to carbon atoms may be substituted by fluorine atoms.

4. A liquid crystal composition comprising at least two compounds selected from the group consisting of compounds of the formula (1) as defined in claim 1, or at least one compound of the formula (1) and at least one polymerizable liquid crystal compound other than the compound of the formula (1).

5. An optical anisotropic material comprising a polymer obtained by polymerizing the liquid crystal composition as defined in claim 4 in a state exhibiting a liquid crystal phase and in a state where liquid crystal is aligned.

6. An optical device employing the optical anisotropic material as defined in claim 5.

7. The compound according to claim 3, wherein A is a trans-1,4-cyclohexylene group.

8. The liquid crystal composition according to claim 4, wherein said at least one polymerizable liquid crystal compound other than the compound of the formula (1) is a compound of the following formula (6):

CH$_2$=CR$^4$—COO—R$^5$-E$^1$-E$^2$-R$^6$ (6)

wherein the symbols have the following meanings;

R$^4$: a hydrogen atom or a methyl group;

R$^5$: a single bond or a hydrocarbon group having from 1 to 8 carbon atoms or a hydrocarbon group having from 1 to 8 carbon atoms, wherein an etheric oxygen atom is bonded on the E$^1$ side, provided that some or all of hydrogen atoms bonded to carbon atoms in the group may be substituted by fluorine atoms, and when the hydrocarbon group has 2 or more carbon atoms, it may have an etheric oxygen atom in a carbon-carbon bond;

R$^6$: an alkyl or alkoxy group having from 1 to 8 carbon atoms, or a fluorine atom, provided that when it is an alkyl or alkoxy group, some or all of hydrogen atoms bonded to carbon atoms in the group may be substituted by fluorine atoms;

E$^1$, E$^2$: each independently a 1,4-phenylene group or a trans-1,4-cyclohexylene group, provided that hydrogen atoms bonded to carbon atoms in the group may independently be substituted by fluorine atoms, chlorine atoms or methyl groups, and at least one of E$^1$ and E$^2$ is a trans-1,4-cyclohexylene group.

9. The liquid crystal composition according to claim 8, wherein the compound of the formula (6) is a compound of the following formula (7):

CH$_2$=CR$^4$—COO-Cy-Cy-R$^6$ (7)

wherein R$^6$ and Cy are as defined above.

10. A method for producing the optical anisotropic material as defined in claim 5, which comprises interposing the liquid crystal composition between a pair of support members subjected to alignment treatment and polymerizing it in a state where the liquid crystal composition exhibits a liquid crystal phase and in a state where the liquid crystal is aligned.

11. The compound according to claim 3, which has the following formula (1A):

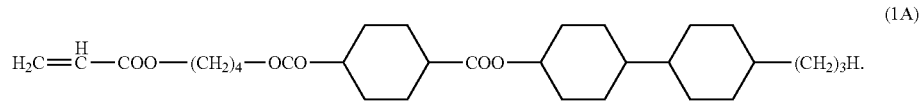

(1A)

12. The compound according to claim 3, which has the following formula (1B):

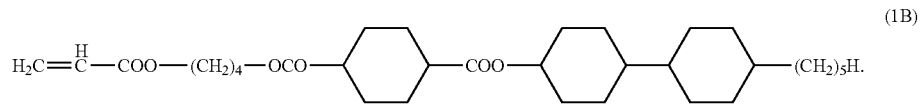

(1B)

* * * * *